US011069352B1

(12) United States Patent
Tang et al.

(10) Patent No.: US 11,069,352 B1
(45) Date of Patent: Jul. 20, 2021

(54) MEDIA PRESENCE DETECTION

(71) Applicant: Amazon Technologies, Inc., Seattle, WA (US)

(72) Inventors: Qingming Tang, Chicago, IL (US); Ming Sun, Winchester, MA (US); Chieh-Chi Kao, Somerville, MA (US); Chao Wang, Newton, MA (US); Viktor Rozgic, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 16/278,440

(22) Filed: Feb. 18, 2019

(51) Int. Cl.
*G10L 15/22* (2006.01)
*G10L 25/78* (2013.01)
*G10L 15/16* (2006.01)
*G10L 15/02* (2006.01)

(52) U.S. Cl.
CPC .............. *G10L 15/22* (2013.01); *G10L 15/02* (2013.01); *G10L 15/16* (2013.01); *G10L 25/78* (2013.01)

(58) Field of Classification Search
CPC ......... G10L 15/22; G10L 25/78; G10L 15/16; G10L 15/02
See application file for complete search history.

(56) References Cited

U.S. PATENT DOCUMENTS

| 5,878,391 A * | 3/1999 | Aarts ....................... G10H 1/00 704/233 |
| 10,699,729 B1 * | 6/2020 | Benami ................... G10L 15/08 |
| 2008/0181417 A1 * | 7/2008 | Pereg ....................... G10L 17/00 381/17 |
| 2009/0055193 A1 * | 2/2009 | Maislos ................... G06F 21/32 704/273 |
| 2009/0319270 A1 * | 12/2009 | Gross ........................ G10L 17/04 704/246 |
| 2015/0161991 A1 * | 6/2015 | Sak ........................ G10L 15/142 704/254 |
| 2015/0340032 A1 * | 11/2015 | Gruenstein ........... G06N 3/0472 704/232 |
| 2016/0171971 A1 * | 6/2016 | Suskind ................. G09B 19/04 704/260 |
| 2017/0025124 A1 * | 1/2017 | Mixter ..................... G10L 15/32 |
| 2017/0148430 A1 * | 5/2017 | Lee .......................... G10L 15/16 |
| 2018/0157638 A1 * | 6/2018 | Li ............................. G06N 3/08 |
| 2018/0330729 A1 * | 11/2018 | Golipour ................. G10L 15/16 |
| 2018/0336197 A1 * | 11/2018 | Skilling ................. G10L 15/187 |
| 2018/0349359 A1 * | 12/2018 | McCann ................... G06N 3/08 |
| 2019/0028766 A1 * | 1/2019 | Wold ................. H04N 21/4665 |
| 2019/0066713 A1 * | 2/2019 | Mesgarani .............. G10L 25/30 |
| 2019/0244603 A1 * | 8/2019 | Angkititrakul ....... G06N 3/0445 |

(Continued)

*Primary Examiner* — Michael Colucci
(74) *Attorney, Agent, or Firm* — Pierce Atwood LLP

(57) ABSTRACT

Described herein is a system for media presence detection in audio. The system analyzes audio data to recognize whether a given audio segment contains sounds from a media source as a way of differentiating recorded media source sounds from other live sounds. In exemplary embodiments, the system includes a hierarchical model architecture for processing audio data segments, where individual audio data segments are processed by a trained machine learning model operating locally, and another trained machine learning model provides historical and contextual information to determine a score indicating the likelihood that the audio data segment contains sounds from a media source.

18 Claims, 14 Drawing Sheets

(56) References Cited

U.S. PATENT DOCUMENTS

2019/0286978 A1* 9/2019 Aggarwal ............ G06N 3/0445
2019/0318754 A1* 10/2019 Le Roux ................ G10L 19/02
2020/0104357 A1* 4/2020 Bellegarda ............. G06N 7/005

* cited by examiner

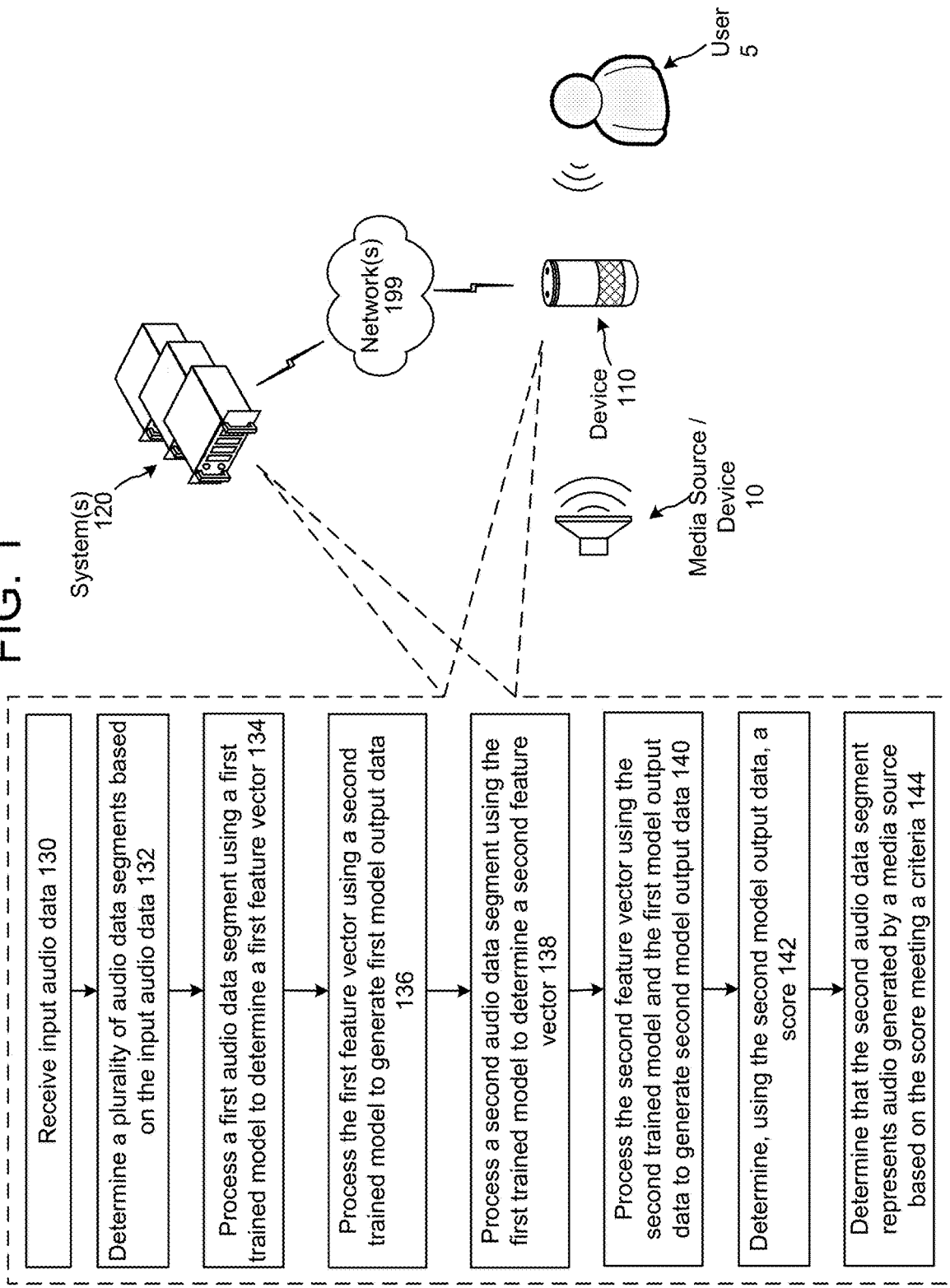

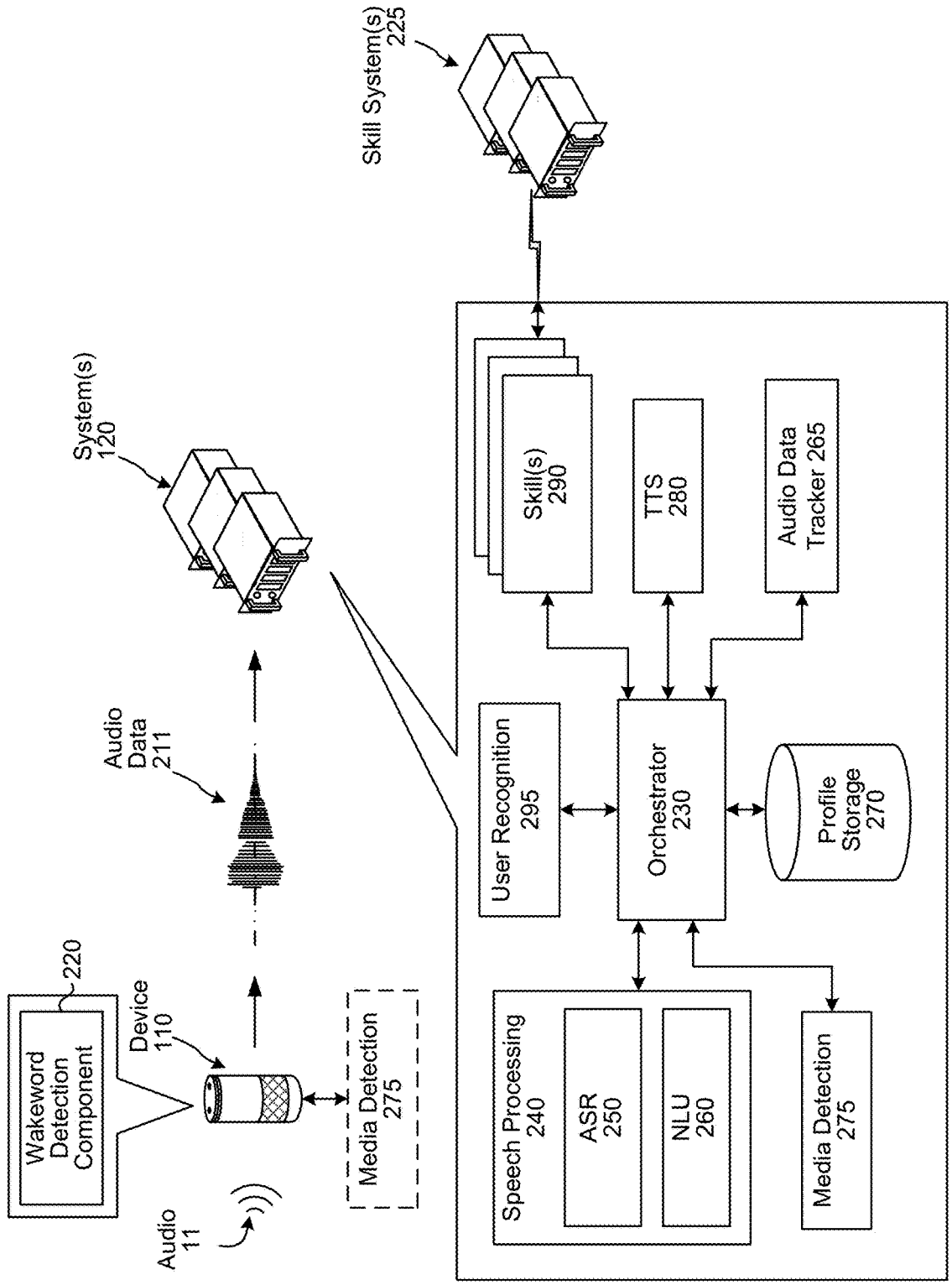

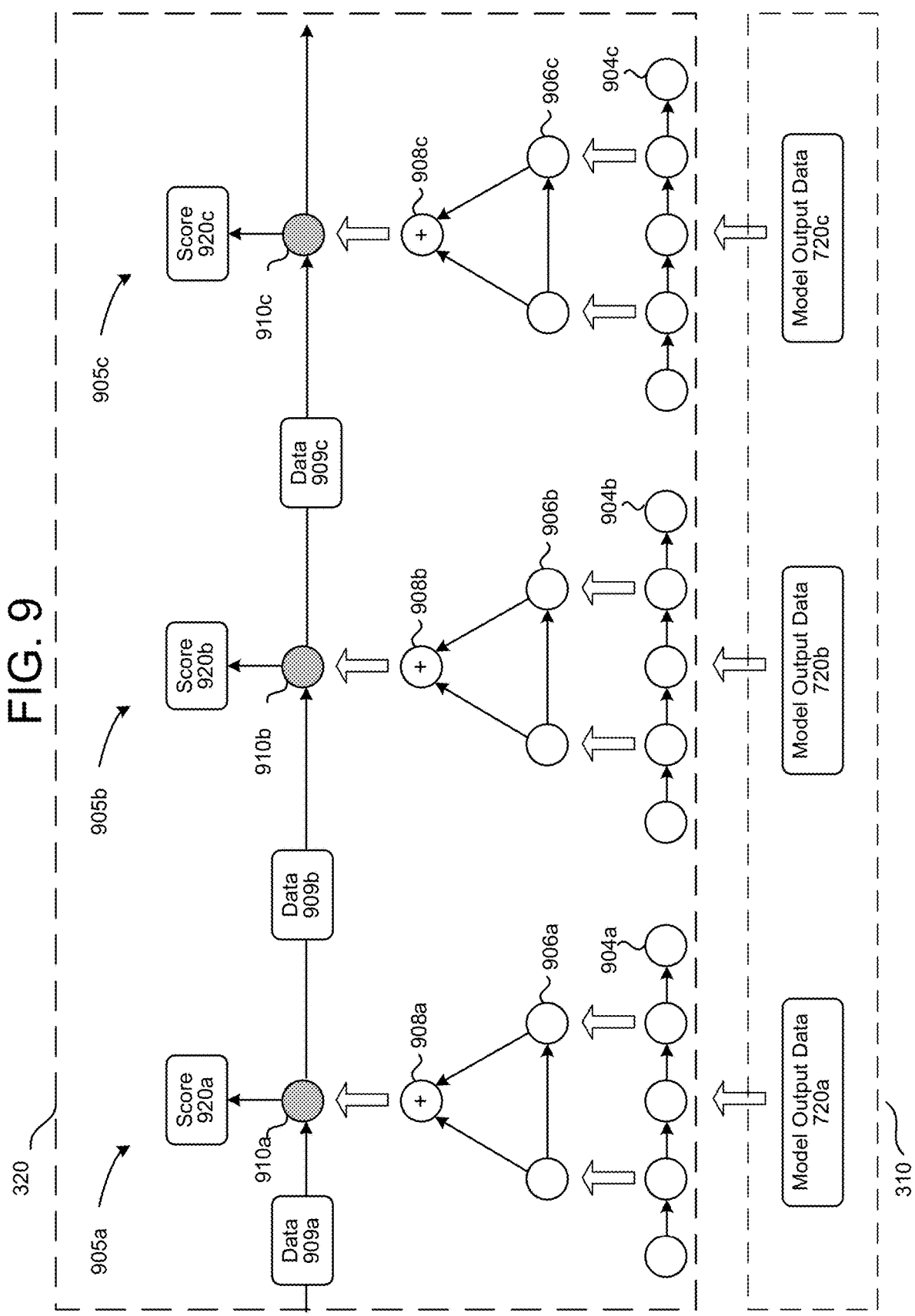

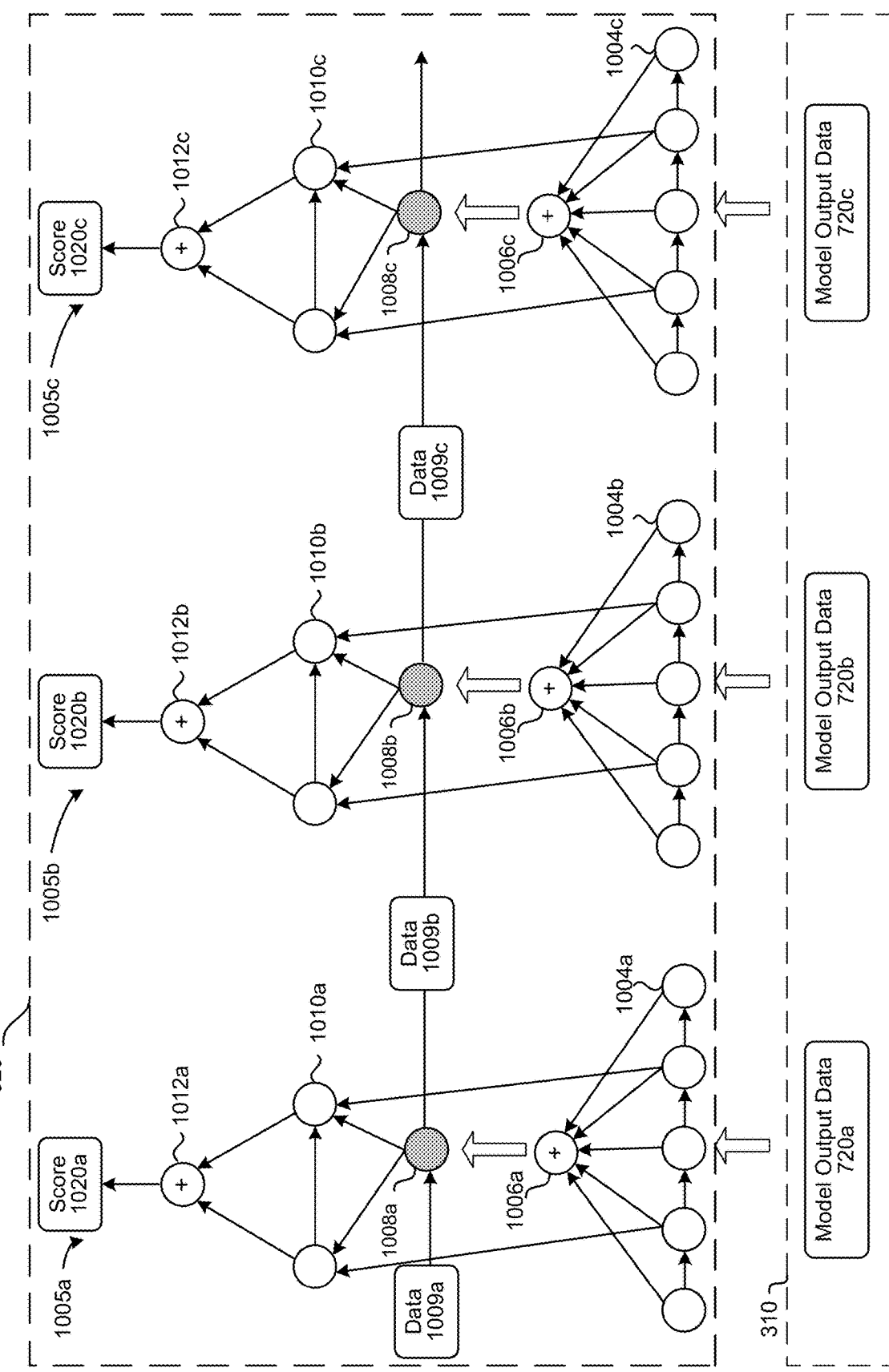

MEDIA PRESENCE DETECTION

BACKGROUND

Speech recognition systems have progressed to the point where humans can interact with computing devices using their voices. Such systems employ techniques to identify the words spoken by a human user based on the various qualities of a received audio input. The audio input may include audio from a human user and other sources such as speakers of electronic devices, appliances, etc. Speech recognition combined with natural language understanding processing techniques enable speech-based user control of a computing device to perform tasks based on the user's spoken commands.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to detect media presence in audio data according to embodiments of the present disclosure.

FIG. 2A is a conceptual diagram of speech processing components of a system according to embodiments of the present disclosure.

FIG. 9 conceptually illustrates an exemplary hierarchical machine learning system consisting of the exemplary trained local model and an exemplary contextual model according to embodiments of the present disclosure.

FIG. 10 conceptually illustrates another exemplary hierarchical machine learning system according to embodiments of the present disclosure.

DETAILED DESCRIPTION

Figure 2B:
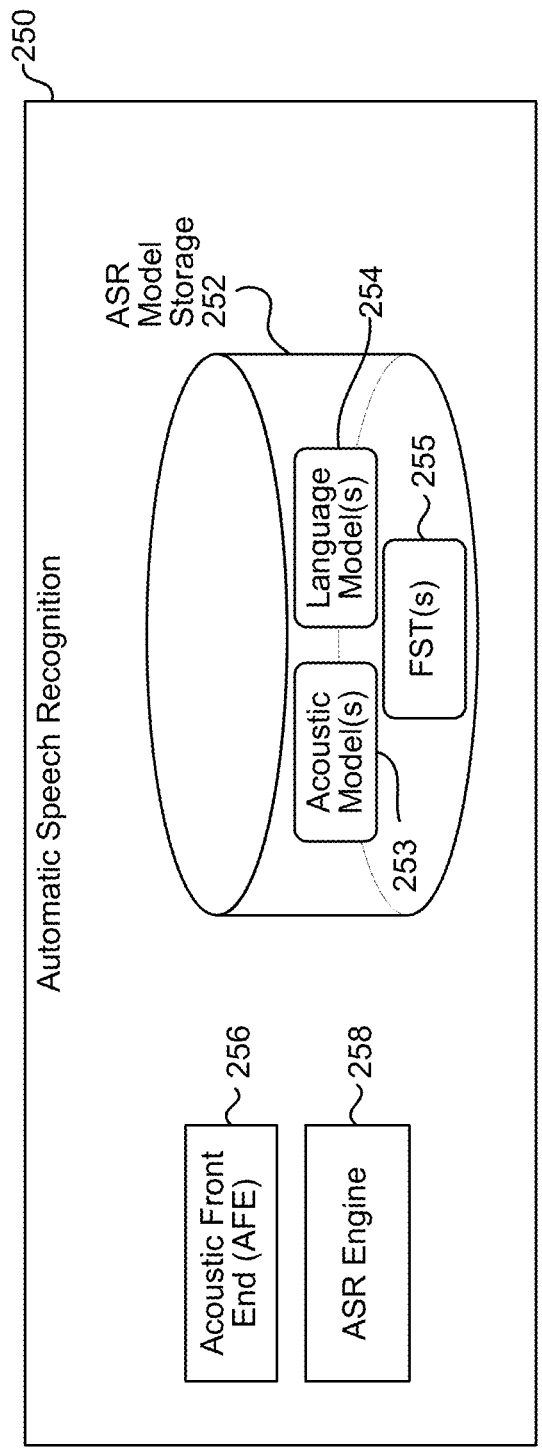
FIG. 2B is a conceptual diagram of automatic speech recognition components of the system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

Such systems receive audio input data that may include the user's input (e.g., a spoken utterance or command) along with other sounds that may be occurring in the environment. A system may be configured to identify sounds from media sources (e.g., sounds that have been pre-recorded and are being played back or are otherwise generated or outputted by a device or a machine source such as television, radio, etc. or other device capable of audio output) to be able to recognize, for example, whether words or sounds represented in the audio input were spoken by a user or generated by a non-human source that was not an audio output device. For example, the system may determine that input audio data representing an utterance is generated by a television (e.g., a person on the television spoke the utterance) versus the input audio data being spoken by a user. In another example, the system may determine that input audio data representing glass breaking was audio data generated from a piece of glass breaking in the environment of a microphone rather than media generated audio of a piece of glass breaking (e.g., a television show during which glass is broken.) Media presence detection may refer to the task of recognizing if there are sounds from media in given sound snippets. For example, media presence detection may assist in distinguishing whether captured audio represents a real dog barking versus a recorded dog barking. Being able to distinguish media sound and human sound is important for certain systems, such as voice-assisted devices or smart speakers (e.g., Amazon Alexa) to reliably detect and process a user's voice rather than a device/machine generated voice. Further, being able to distinguish media sound from live sound may also be useful in non-speech situations, such as being able to distinguish from when actual glass is breaking (which may be useful to an alarm system) from a recording of glass breaking (which may accidentally cause an alarm system to recognize a false positive).

Thus, in certain cases, a system may be configured to perform different actions in response to detecting sounds from media sources than from live sources. For example, a system may detect a security alarm sound or a sound of breaking a window glass represented in input audio data, and identify the sound as being generated by a television (TV). In this case, the systems may ignore the sounds, instead of performing an action such as, for example, notifying the home owner, alerting law enforcement, and/or taking any other action(s) triggered by the sound.

Machine learning (ML), as discussed herein, refers to a computing technique that allows systems to learn ways to solve complex problems without needing an explicit algorithm for the system to follow. ML may use a trained model that consists of internally configured operations that can manipulate a particular type of input data to determine a desired result. Trained models can be used in many computing tasks such as computer vision, speech processing, predictive analyses, and many more.

Trained models may take a variety of forms including trained classifiers, support vector machines (SVMs), neural networks (such as deep neural networks (DNNs), recurrent neural networks (RNNs), Long Short-Term Memory (LSTM) neural networks, or convolutional neural networks (CNNs)) and others. As an example, a neural network can include an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

This patent application describes systems and methods related to media presence detection using audio data. Trained ML models/techniques may be used to perform media presence detection or other functions executed by the system. The systems and methods described herein detect if audio data contains sounds from "artificial" media (as opposed to speech from humans or sounds from animals, etc.). The systems and methods may detect presence of media sounds within snippets (short audio data sections of configurable length, but typically lasting a few seconds) of a long recorded stream of audio captured by a device.

The systems and methods described herein may use machine learning models to detect media presence within audio data. One of the challenges of detecting media sounds within a recorded audio stream is that audio data snippets can represent audio from a mixture of sources (e.g., sounds from a TV, sounds from a dishwasher, etc.). Another challenge for detecting media sounds is that the non-media sound sources may vary significantly (e.g., human speech, non-vocal sounds like dish washing, sounds from non-human sources like dogs, etc.). One challenge with using machine learning models for such tasks is that available training data used to train the machine learning model may have weak labels or no labels. For example, labels of the training data may indicate if media presence exists in a fixed length audio snippet without specifying the exact boundary of media presence. Additionally, the training data may not be completely labeled due to ambiguity as to some sound snippets. Such ambiguities may make training ML models difficult.

Offered is a system that detects media presence in an audio segment of audio data using contextual data provided by one or more other segments of the audio data. The system may receive audio data corresponding to a period of time, where that period of time may be broken into shorter periods of time corresponding to audio data segments. The system determines a score representing the likelihood that an audio segment includes sounds generated by a media source. The score may be determined partly based on the content of and/or the score of another audio segment within the longer audio input (for example, for a neighboring audio segment). In a patentable improvement, the systems and methods described herein may use an inventive machine learning model architecture to learn a signal-level representation of a recorded audio segment (e.g., five seconds worth of audio data), and ensure the local signal-level representation is consistent with a larger context provided by the audio data corresponding to a larger period of time.

The input audio data for the system may be a continuous stream of audio data consisting of relatively stable long-range (or high-level) information (e.g., speaker identity if it is speech, signal-to-noise ratio information, audio frequency information) and local information (e.g., phonetic content). Some characteristics, such as those that can be used to distinguish if a sound is from a media source or non-media source may lie in long-duration features, such as signal-to-noise ratio information and audio frequency information, instead of local information. Changes in the signal-to-noise ratio and audio frequency information in the longer duration audio data may be used to detect when a media source is turned on or off. Taking that into consideration, the systems and methods described herein may use a Long Short-Term Memory (LSTM) ML model on top of a residual network ML model to extract features for each short audio segment. Other methods for media presence detection may typically be based on a short duration of audio without taking into consideration information provided by a longer audio stream. In a patentable improvement, the systems and methods described herein utilize information from a large audio stream (e.g., 30 minutes to 60 minutes) to increase the confidence level of predicting media presence in a short segment (e.g., 5 seconds) of the audio stream, considering that a media source may often be on/off for a continuous long duration. Moreover, more detailed consideration of lengthier portions of the audio data may help the ML models to more precisely detect the start and end of media presence events. Having this more precise information may also be useful for labeling specific portions of audio data as representing (or not representing) media sounds.

In an example embodiment, a unidirectional LSTM is used to chain together the local residual network for each segment, thus modeling the context of the larger audio stream for use in considering an individual audio data segment from the longer audio data. Such a hierarchical model employed by the system described herein may operate faster or more efficiently as compared to using single ML model for the entire large audio stream. In some embodiments, the systems and methods described herein may be used to iteratively impute missing labels in the training data.

FIG. 1 illustrates a system configured to detect media presence in an audio stream according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110 local to a user 5 and a media source 10, and one or more systems 120 connected across one or more networks 199. The processes described with respect to FIG. 1 may be performed during offline operations. The operations are generally described herein as being performed by the system(s) 120. However, it should be understood that one or more of the operations may also be performed by the device 110.

As shown in FIG. 1, system(s) 120 receives (130) input audio data. The input audio data may be captured by the device 110 and may include speech or sounds from the user 5 and/or sounds from the media source 10. The system(s) 120 determines (132) a plurality of audio data segments (e.g., segments of audio data representing 20 ms segments of audio) based on the input audio data, and processes (134) a first audio data segment of the plurality of audio data segments using a first trained model to determine a first feature vector representing the first audio data segment. The first trained model may be a residual network machine learning (ML) model as described further below (e.g., model 700 of FIG. 7). The first feature vector may be the output of the first trained model. The system(s) 120 processes (136) the first feature vector using a second trained model to generate first model output data. The second trained model may be one or more neural network ML models as described further below (see FIGS. 9 and 10). The first model output data (e.g., data 909 or data 1009) may represent historical and/or contextual information of the second trained model. The system(s) 120 may process (138) a second audio data segment using the first trained model (e.g., model 700) to determine a second feature vector representing the second audio data segment. The system(s) 120 may process (140) the second feature vector using the second trained model and the first model output data to generate second model output data (e.g., output of model 910 or output of model 1008). The second model output may include historical or contextual information derived from processing of the first feature vector/first audio data segment and the second feature vector/second audio data segment.

The system(s) 120 determines (142) a score indicating the likelihood that the second audio data segment represents audio from a media source (e.g., the media source 10) using the second model output data. Based on the score meeting a criteria (such as meeting a threshold), the system(s) 120 determines (144) that the second audio data segment represents audio generated by the media source 10.

The system(s) 120 may process the second audio data segment using the first trained model to generate third model output data. The second feature vector may be derived from the third model output data. The system(s) 120 may process the second feature vector using the second trained model and the first model output data to generate fourth model output data. The second model output data may be generated by processing the fourth model output data using a another trained model.

In an example embodiment, the system(s) 120 may determine that the second audio data segment represents a portion of a wakeword, and may generate an indicator based on the second audio data segment representing audio from the media source 10. The system(s) 120 may determine to stop further speech processing of the audio data received from the device 110 based on the second audio data segment representing audio from a media source 10. The system(s) 120 may send the indicator to the device 110.

In an example embodiment, the system(s) 120 may determine a sound event is represented in the second audio data segment, and determine that the second audio data segment includes audio from a non-media source. The system(s) 120 may generate an indicator based on the second audio data segment including audio from the non-media source, and may send the indicator to the device 110. For example, a security alarm, a window glass breaking sound or a dog barking sound may be detected by the system(s) 120. The system(s) 120, using the steps described herein, may determine whether the sound is generated by the media source 10 (e.g., TV, radio, smartphone, etc.) or by a non-media source. If the sound is generated by the media source 10, then the system(s) 120 may ignore the sound and/or stop further processing of the audio data representing the sound. In other embodiments, if the sound is generated by the media source 10 the system(s) 120 may send the input audio data to an analysis component for further processing (e.g., to determine what device/machine generated the audio, what does the input audio data represent, etc.) If the sound is generated by a non-media source (e.g., the actual security alarm is set-off, a window was broken, a dog was barking), the system(s) 120 may send the input audio data to an analysis component (e.g., a third party device such as a home security system, a skill system 225, another component included in the device 110 or system(s) 120) to perform further actions, such as alerting the user 5 of the security breach. Thus the system may compare the input audio data to stored audio data corresponding to an event (e.g., glass breaking, a baby crying, etc.) and also determine whether the input audio data corresponds to a media source or a non-media source. If the event was detected and the input audio data was not media generated, the system may generate an indicator (e.g., a data indicator that may be sent to a further component) to indicate that the event was detected in the environment of an audio capture device (rather than the event was detected, but it was generated by some audio output device). The indicator may then be used for various purposes (sending a notification, tripping an alarm, etc.)

In an example embodiment, the system(s) 120 may store a label associating the audio segment as including or not-including sounds from a media source based on the score. The system(s) 120 may also flag the audio segment for further processing, for example, speech processing, based on the score indicating that the audio segment does not include sounds from a media source. The system(s) 120 may also send a notification to a user device based on the score of the audio segment. For example, the system(s) 120 may consider the scores of multiple audio segments, along with other criteria (e.g., time of day, user's location, etc.) and determine that a media source (e.g., TV, radio, etc.) may be left on for a long period of time (the time being configurable by the user or the system).

The overall system of the present disclosure may operate using various components as illustrated below. The various components may be located on same or different physical devices. Communication between various components may occur directly or across a network(s) 199.

As shown in FIG. 2A, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120. In some embodiments, the device 110 may begin transmitting audio data 211 to system(s) 120 (or otherwise performing further processing on audio data) in response to an event occurring or an event being detected by the device 110.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 transcribes the input audio data 211 into input text data representing one or more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include an audio data tracker 265 that manages and/or tracks audio data recorded by the device 110. The system(s) 120 may include a media detection component 275 that detects media presence in the audio data 211. Further details of the media detection component 275 is described in connection with FIG. 3. The media detection component 275 may be included and operated by a local device 110.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The components 275, 265 and other components are generally described as being operated by the system(s) 120. However, the device 110 may also operate one or more of the components, including the media detection component 275 and the audio data tracker 265.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 or 20 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the MINI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities.

After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Figure 3:
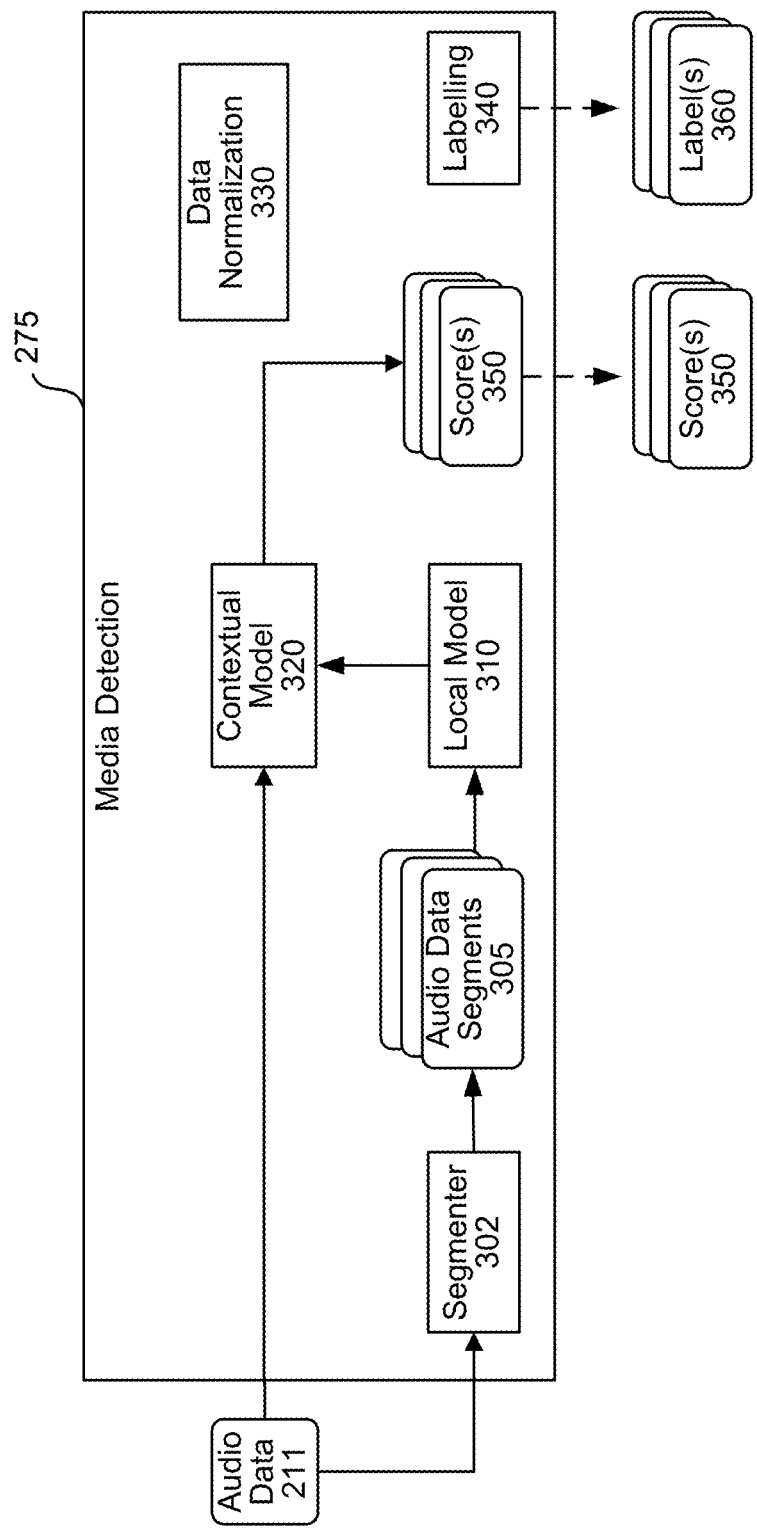
FIG. 3 is a conceptual diagram illustrating a media detection component according to embodiments of the present disclosure.

FIG. 3 is a conceptual diagram illustrating a media detection component 275 according to embodiments of the present disclosure. The media detection component 275 may include a local model component 310 that manages and stores the residual network ML models and/or other models for purposes of determining whether audio data represents (or doesn't represent) audio from a media source. The residual network ML models may be used to analyze individual audio data segments 305.

The media detection component 275 may include a segmenter component 302. The segmenter component 302 may determine the audio data segments 305 from the audio data 211 by dividing the audio data 211 into smaller segments. In an example embodiment, the audio data segments 305 may be five-seconds non-overlapping segments of the audio data 211. That is, a first audio data segment may have a first temporal beginpoint and a first temporal endpoint, and a second audio data segment may have a second temporal beginpoint and a second temporal endpoint, where the first temporal endpoint does not occur between the second temporal beginpoint and the second temporal endpoint. In an example embodiment, the segmenter component 302 may determine the audio data segments 305 from the audio data 211 by extracting log mel-filter bank energy (LFBE) features from the audio data 211 with a window of 25 ms shifted at every 10 ms, resulting in a 498 frame×20 dimension feature matrix (a form of feature vector) corresponding to a 5-second audio data segment. The 498×20 feature matrix is used as an example herein. As one in the art will understand, the teachings herein may also be applied for other size data 702 depending on system configuration.

Figure 7:
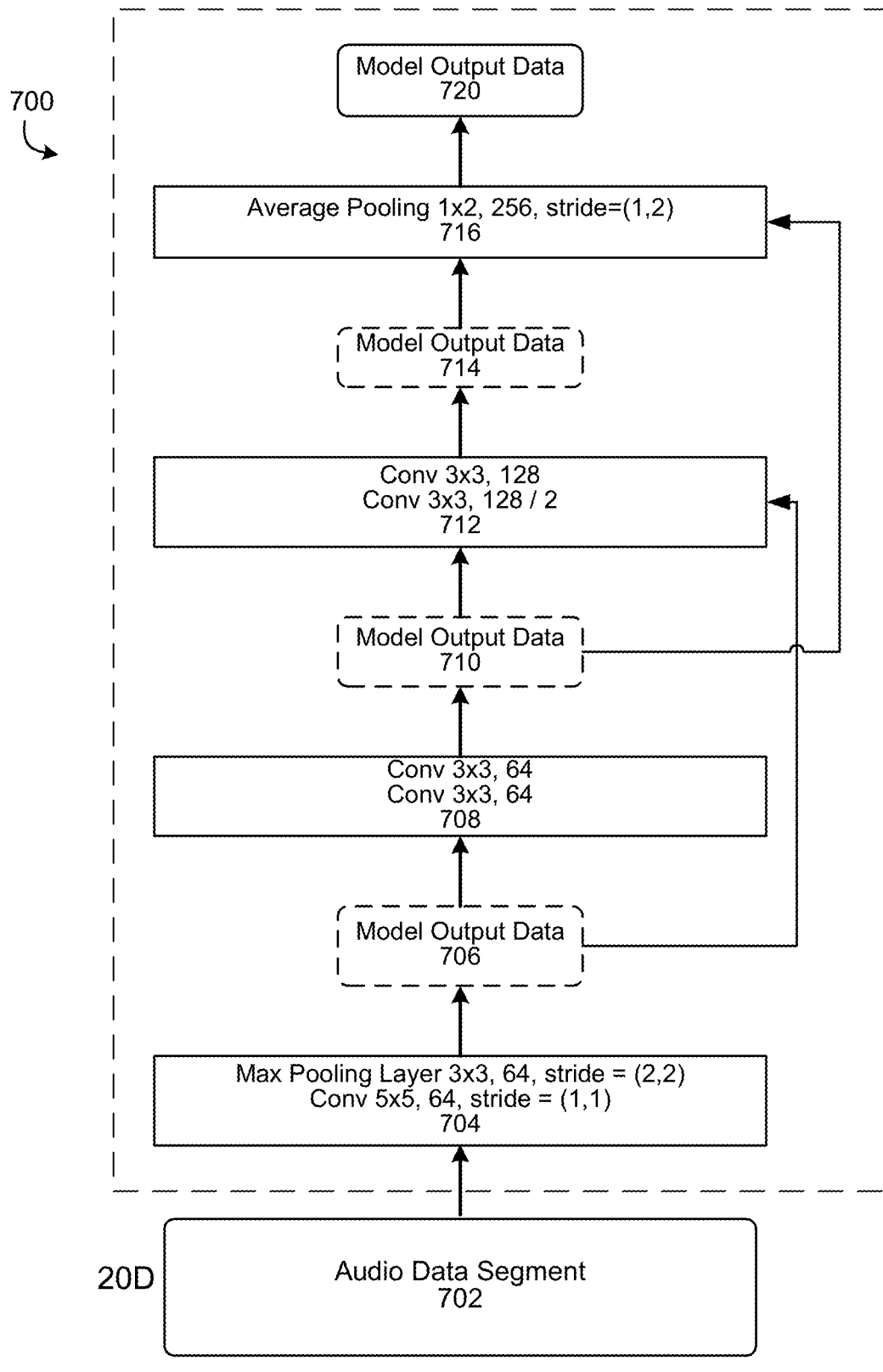
FIG. 7 conceptually illustrates an exemplary trained local model in the form of a residual network according to embodiments of the present disclosure.

The residual network ML model executed by the local model component 310 may consist of a shallow residual network ML model 700 as illustrated in FIG. 7. The exemplary residual network ML model 700 consists of two residual blocks 708, 712, proceeded by one 5×5 convolution and 3×3 pooling layer 704, followed by an average pooling layer 716. Further details of the residual network ML model is described below in connection with FIG. 7.

The media detection component 275 may include a contextual model component 320 that manages and stores neural network ML models. In an example embodiment, the contextual model component 320 may employ a pyramidal architecture of multiple neural network ML models (illustrated in FIGS. 9 and 10). In an example embodiment, the neural network ML models employed by the contextual model component 320 may be recurrent neural network (RNN) models. In an example embodiment, the RNN models may be unidirectional LSTM models. In an example embodiment, the RNN models may be bi-directional LSTM models. The neural network ML models may be used in conjunction with the output of the residual network ML models to analyze audio data segments 305 and to provide contextual information from the audio data 211.

The contextual model component 320 facilities utilization of broad contextual information to better detect media presence in an audio data segment. The contextual model component 320 may process the audio data 211 in its entirety. The contextual model component 320 works in conjunction with an ensemble of residual network ML models implemented by the local model component 310 and may use a unidirectional LSTM model to provide contextual information. The unidirectional LSTM model may combine historical memory and local representation generated by the residual network ML models to detect media presence in an audio data segment.

In this manner, the media detection component 275 employs a hierarchical model where the local model component 310 analyzes short audio data segments derived from the longer input audio data, and the contextual model component 320 analyzes the output data generated by the local model component 310 in conjunction with contextual information from the longer input audio data. The details of the ML model employed by the contextual model component 320 is provided below in connection with FIGS. 9 and 10.

There are certain benefits to use a hierarchical model implemented using the local model component 310 and the contextual model component 320 as described herein. One is that the input audio data can be long (e.g., 30 minutes) and running a RNN model directly on the audio data can consume a lot of time and computing resources. Another benefit is that a RNN model can suffer from the gradient vanishing problem if the input audio data is long. Another benefit is that a hierarchical architecture naturally exists in a longer duration input audio data. For example, the turning on/off of a media source is not easily observed within a short duration (e.g., 5 seconds), but it is easier to realize when a media source is turned on or off in a larger duration of audio data.

The media detection component 275 may also include an audio data normalization component 330 that analyzes the audio data segments 305 and performs certain normalization techniques. Each recorded longer duration of audio data may have a different recording environment and a specific channel effect. In one embodiment, normalizing the audio data involves removing the per-stream mean and variance for each audio data segment (e.g., 5-second segments), similar to removal of per-speaker mean and variance in speech recognition. For example, a longer duration of audio data $x_{1:T}$ may consist of T audio data segments, where each segment may be represented by a 498×20 dimensional feature vector, and normalization may be performed as follows:

$$\mu = \frac{\sum_{t=1}^{T}\sum_{i=1}^{498} x_{ti}}{498 \times T} \quad \text{Equation (1)}$$

$$\delta = \sqrt{\frac{\sum_{t=1}^{T}\sum_{i=1}^{498}(x_{ti}-\mu)^2}{498 \times T - 1}} \quad \text{Equation (2)}$$

$$x'_{ti} = \frac{x_{ti}-\mu}{\delta} \quad \text{Equation (3)}$$

Since each $x_{ti}$, for $1 \le t \le T$ and $1 \le i \le 498$ is a 20-dimensional vector, equation 3 is performing a per-element operation. After the normalization, each $x_{ti}$ approximately follows zero mean identity Gaussian. Performing the stream-based normalization is helpful with respect to analysis of the audio data segments. The stream-based normalization may also be another method for utilizing contextual information in determining presence of sounds from a media source.

The media detection component 275 may also include a labelling component 340 that analyzes audio data and imputes labels based on detecting media presence within an audio data segment. For example, the labelling component 340 may determine a label(s) 360 (e.g., including sounds from a media source or not-including sounds from a media source) for an audio segment within the training data used to train the ML models of the media detection component 275. The labels may be determined based on the score or scores of the neighboring audio segments in the training data. As described above, the task of media presence detection using ML models can be challenging because existing data used to train ML models may be partially labeled. That is, portions of the training data may not be labeled as whether or not it includes media presence in the audio. To overcome this challenge, during training of the ML models implemented by the media detection component 275 masks may be added to the final model output data of audio data segments that are not labeled, such that only loss for 5-second segments that are labeled is calculated. In this manner, the unlabeled training data only contributes to the historical memory of the ML models. The labelling component 340 may predict labels of the unlabeled training data during training. In an example embodiment, the labels may be used to better calculate the loss in further training steps. The labels may be iteratively updated during further training steps. Addition of the labels during training of the ML models may increase the performance of the ML models.

The input to the media detection component 275 may be the audio data 211 and the output of the media detection component 275 may be score(s) 350, where each score 350 represents the likelihood that the corresponding respective audio data segment 305 represents audio generated by a media source. The score(s) 350 may be outputted by the local model component 310 or the contextual model component 320.

Figure 4:
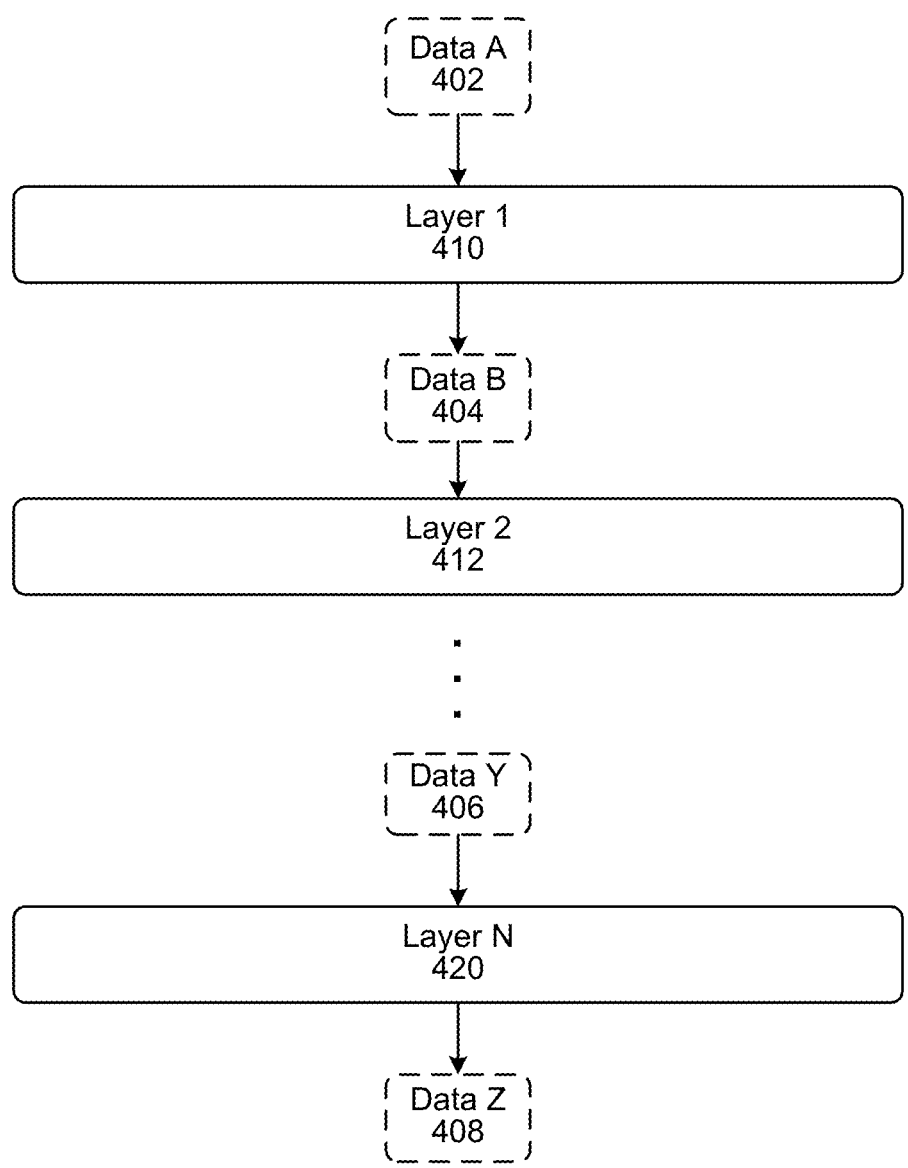
FIG. 4 is a conceptual diagram illustrating layers of a trained model according to embodiments of the present disclosure.

The ML model for the contextual model component 320 may take many forms, including a neural network. As illustrated in FIG. 4, a neural network may include a number of layers, from input layer 1 410 through output layer N 420. Each layer is configured to output a particular type of data and output another type of data. The neural network illustrated in FIG. 4 is configured to input data of type data A 402 (which is the input to layer 1 410) and output data of type data Z 408 (which is the output from the last layer N 420). The output from one layer is then taken as the input to the next layer. For example, the output data (data B 404) from layer 1 410 is the input data for layer 2 412 and so forth such that the input to layer N 420 is data Y 406 output from the penultimate layer (not shown).

While values for the input data/output data of a particular layer are not known until a neural network is actually operating during runtime, the data describing the neural network describes the structure and operations of the layers of the neural network.

Figure 5:
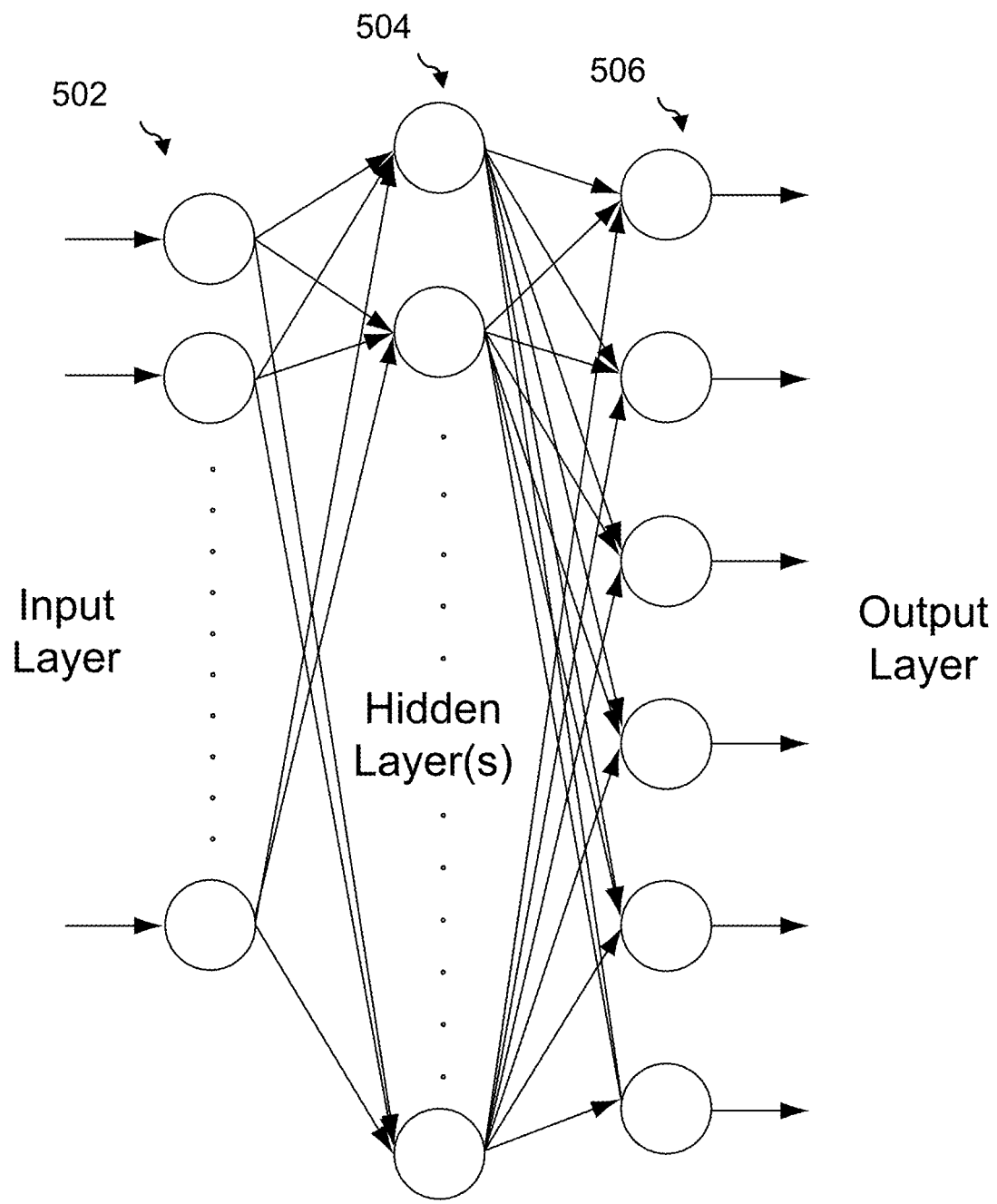
FIG. 5 illustrates a neural network for speech recognition according to embodiments of the present disclosure.

An example neural network for the contextual model component 320 is illustrated in FIG. 5. A neural network may be structured with an input layer 502, middle layer(s) 504, and an output layer 506. The middle layer(s) may also be known as the hidden layer(s). Each node of the hidden layer is connected to each node in the input layer and each node in the output layer. Although illustrated in FIG. 5 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 6:
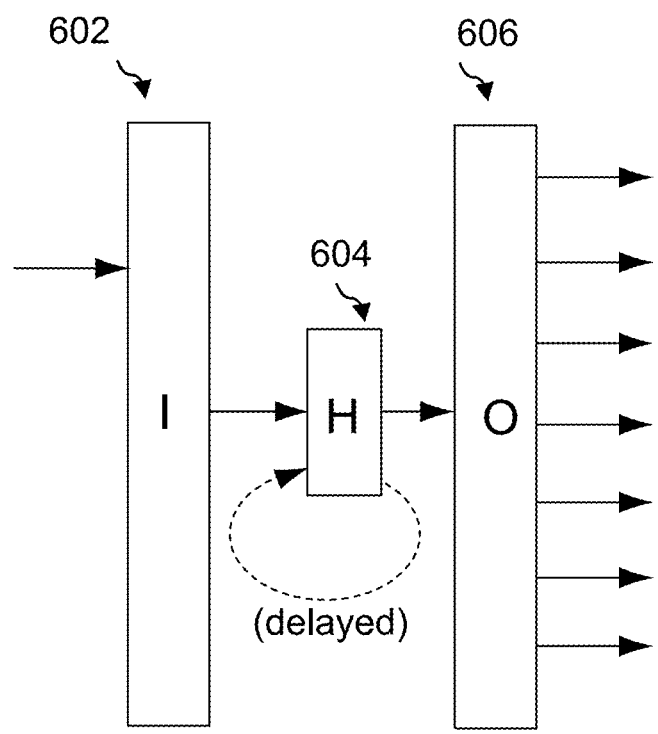
FIG. 6 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 6. Each node of the input layer 602 connects to each node of the hidden layer 604. Each node of the hidden layer 604 connects to each node of the output layer 606. As illustrated, the output of the hidden layer 604 is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 6, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

FIG. 7 conceptually illustrates an exemplary residual network ML according to embodiments of the present disclosure. The local model component 310 may employ a residual network ML model. In a residual network ML model each layer feeds into the next layer and directly into the layers about 2 to 3 hops away as illustrated in FIG. 7. For example, the model output data 706 after the first layer 704 is inputted into the second layer 708 and the third layer 712. The model output data 710 after the second layer is inputted into the third layer 712 and the fourth layer 716. The exemplary residual network ML model illustrated in FIG. 7 consists of two residual blocks 708, 712, proceeded by one 5×5 convolution and 3×3 pooling layer 704, followed by an average pooling layer 716. Using 704, 708 and 712 components, the residual network ML model transforms the input audio data segment 702 represented as a 498×20 dimensional input into a 125×256 dimensional intermediate representation (model output data 720), reducing the length of temporal domain to ¼ of the original length of the audio data segment 702. The 125×256 dimensional representation 720 is inputted into pyramid RNNs followed by the average pooling layer 716 and an output layer (softmax layer). The output may be a real number between 0 and 1. The larger the value, the higher likelihood that the audio data segment 702 contains a media source sound.

Figure 8A:
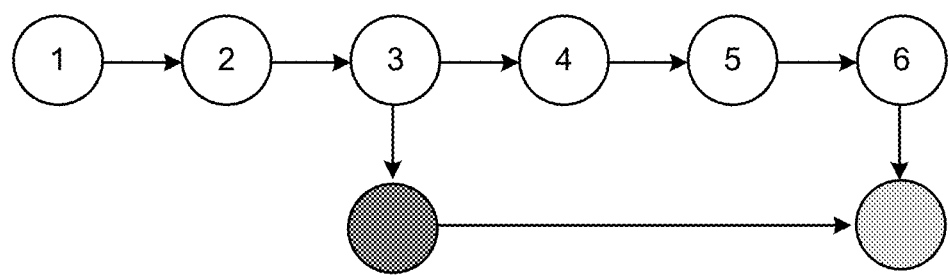
FIGS. 8A and 8B conceptually illustrates a pyramidal architecture for the exemplary trained local model according to embodiments of the present disclosure.
Figure 8B:
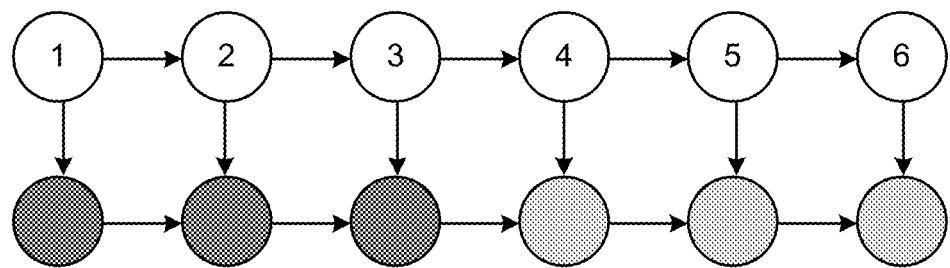

FIGS. 8A and 8B conceptually illustrates a pyramidal architecture for the exemplary contextual model component according to embodiments of the present disclosure. As shown in FIG. 8A, a pyramidal layer may downsample its input layer by a fixed scaling factor. This is equivalent to enforcing a segmental structure to the hidden states as shown in FIG. 8B. Stacking a few pyramid layers may enforce the residual network ML model to ignore the very short term variations, implementing the idea that features for media presence detection task may be signal level rather than local/phonetic level. In an example embodiment, the residual network component 310 may employ the pyramidal layer illustrated in FIG. 8A in which the skipping scheme is used. In an example embodiment, the residual network ML model uses 3 pyramidal layers. In other embodiments, the residual network 310 may use other schemes for downsampling including, but not limited to, concatenation.

FIG. 9 conceptually illustrates an exemplary hierarchical model architecture consisting of the exemplary residual network ML model 700 and the exemplary neural network ML model according to embodiments of the present disclosure. As described herein, each audio data segment 702 is modeled by the residual network ML model 700 executed by the local model component 310, while the contextual information, such as the media source turning on/off is modeled by the neural network executed by the contextual model component 320.

The output of the residual network ML model 700 generated by the local model component 310 is inputted into the contextual model component 320 that executes a pyramidal neural network architecture illustrated in FIG. 9. The local model component 310 is used as a feature extractor to determine a representation of each audio data segment 702. The representation is inputted into the contextual model component 320. For example, in a first step 905*a*, a first audio data segment 702*a* is inputted into the residual network ML model 700 and as described in connection with FIG. 7, model output data 720*a* is generated. The model output data 720*a* is inputted in a first neural network (e.g., a bi-directional LSTM) 904*a*. Using the pyramidal downsample structure described in connection with FIG. 8A, the output of the neural network 904*a* is downsampled and fed into a second neural network (e.g., a bi-directional LSTM) 906*a*. The output of the nodes of the neural network 906*a* is aggregated (e.g., by averaging the output of the nodes, by summing the output of the nodes, etc.) to determine model output data 908a.

The model output data 908a is inputted into a third neural network 910a (e.g., a unidirectional LSTM). The hidden state of the neural network ML model 910a represents the historical and contextual information (data 909a) of the previous audio data segments of the input audio data 211. The output of the neural network ML model 910a is score 920a. The score 920a may be a number between 0 and 1. In an example embodiment, the larger the score 920a, the more likely the audio data segment 702a includes a media source sound. In an alternative embodiment, the smaller the score 920a, the more likely the audio data segment 702a includes a media source sound.

Similarly, in a second step 905b, a second audio data segment 702b of audio data 211 is inputted and analyzed by the residual network ML model 700 to generate model output data 720b. The model output data 720b is inputted in a first neural network (e.g., a bi-directional LSTM) 904b. Using the pyramidal downsample structure described in connection with FIG. 8A, the output of the neural network 904b is downsampled and fed into a second neural network (e.g., a bi-directional LSTM) 906b. The output of the nodes of the neural network 906b is aggregated (e.g., by averaging the output of the nodes, by summing the output of the nodes, etc.) to determine model output data 908b. The model output data 908b is inputted into the neural network ML model 910b (e.g., unidirectional LSTM). The hidden state of the neural network ML model 910a represents the historical and contextual information (909b) of the previous audio data segment (702a). The output of the neural network ML model 910b is score 920b. The score 920b may be a number between 0 and 1. In an example embodiment, the larger the score 920b, the more likely the audio data segment 70ba includes a media source sound. In an alternative embodiment, the smaller the score 920b, the more likely the audio data segment 702b includes a media source sound.

As illustrated in FIG. 9, in a third step 905c, a third audio data segment 702c is inputted and analyzed by the residual network ML model 700, and the model output 720c is analyzed by the contextual model component 320 as described above in connection with audio data segments 702a and 702b. In an example embodiment, the first audio data segment 702a, the second audio data segment 702b, and the third audio data segment 702c are consecutive segments of the audio data 211. In other embodiments, the audio data segments 702a, 702b, and 702c may not be consecutive audio data segments of audio data 211.

FIG. 9 also illustrates the pyramidal structure of the architecture employed by the contextual model component 320 between neural networks 904 and 906, where the skipping scheme described in connection with FIG. 8A is employed.

FIG. 10 conceptually illustrates another exemplary hierarchical model architecture according to embodiments of the present disclosure. The hierarchical model illustrated in FIG. 9 incorporates the contextual information and historical data in the final stage of operations to determine a score 920 for the audio data segment 702. In another embodiment, the hierarchical model of FIG. 10 uses the contextual information and historical data in an intermediate stage of operations. The hierarchical model of FIG. 10 takes into consideration that the contextual information generated by the first neural network of the contextual model component 320 contributes different information than the data generated by the other neural networks. In this hierarchical model architecture, the model output data from a first neural network 1004 is inputted into a second neural network ML model 1008 that incorporates contextual/historical information from another audio segment, and the output of the neural network ML model is inputted into a third neural network 1010a, the final output of which is the score for the audio data segment indicating the likelihood of the audio data segment including a media source sound.

As illustrated in FIG. 10, in a first step 1005a, a first audio data segment 702a is inputted and analyzed by the residual network ML model 700 to generate model output data 720a as described in connection with FIG. 7. The model output data 720a is inputted into a first neural network ML model (e.g., a bi-directional LSTM) 1004a. The output of the nodes of the neural network 1004a may be aggregated (e.g., the output of the nodes is averaged, the output of the nodes is summed, etc.) to determine model output data 1006a. The model output data 1006a is inputted into a second neural network ML model (e.g., a unidirectional LSTM) 1008a. The hidden state of the neural network ML model 1008a represents the historical and contextual information (1009a) of the previous audio data segments of the input audio data 211. The output of the neural network ML model 1008a is inputted into a third neural network ML model (e.g., a bi-directional LSTM) 1010a along with the model output data generated by the second neural network ML model 1008a. The model data of the neural network ML model 1004a may be downsampled after employing the skipping scheme (as discussed in connection with FIG. 8A) and inputted into the third neural network ML model 1010a. The output of the third neural network ML model 1010a is aggregated (e.g., the output of the nodes is averaged, the output of the nodes is summed, etc.) to determine model output data 1012a. The model output data 1012a may be used to determine a score 1020a. The score 1020a may be a number between 0 and 1. In an example embodiment, the larger the score 1020a, the more likely the audio data segment 702a includes a media source sound. In an alternative embodiment, the smaller the score 1020a, the more likely the audio data segment 702a includes a media source sound.

Similarly, in a second step 1005b, a second audio data segment 702b is inputted and analyzed by the residual network ML model 700 to generate output data 720b. The model output data 720b is inputted into a first neural network ML model (e.g., a bi-directional LSTM) 1004b. The output of the nodes of the neural network 1004b may be aggregated (e.g., the output of the nodes is averaged, the output of the nodes is summed, etc.) to determine model output data 1006b. The model output data 1006b is inputted into a second neural network ML model (e.g., a unidirectional LSTM) 1008b. The hidden state of the neural network ML model 1008b represents the historical and contextual information (1009b) of the previous audio data segment 720a of the input audio data 211. The output of the neural network ML model 1008b is inputted into a third neural network ML model (e.g., a bi-directional LSTM) 1010b along with the model output data generated by the second neural network ML model 1008b. The model data of the neural network ML model 1004b may be downsampled after employing the skipping scheme (as discussed in connection with FIG. 8A) and inputted into the third neural network ML model 1010b. The output of the third neural network ML model 1010b is aggregated (e.g., the output of the nodes is averaged, the output of the nodes is summed, etc.) to determine model output data 1012b. The model output data 1012a may be used to determine a score 1020b. The score 1020b may be a number between 0 and 1. In an example embodiment, the larger the score 1020*b*, the more likely the audio data segment 702*b* includes a media source sound. In an alternative embodiment, the smaller the score 1020*b*, the more likely the audio data segment 702*b* includes a media source sound.

As illustrated in FIG. 10, in a third step 1005*c*, a third audio data segment 702*c* is inputted and analyzed by the residual network ML model 700, and the model output data 720*c* is analyzed by the contextual model component 320 as described above in connection with audio data segments 702*a* and 702*b*. In an example embodiment, the first audio data segment 702*a*, the second audio data segment 702*b*, and the third audio data segment 702*c* are consecutive segments of the audio data 211. In other embodiments, the audio data segments 702*a*, 702*b*, and 702*c* may not be consecutive audio data segments of audio data 211.

FIG. 10 also illustrates the pyramidal structure of the architecture employed by the contextual model component 320 between neural networks 1004 and 1010, where the skipping scheme described in connection with FIG. 8A is employed.

Figure 11:
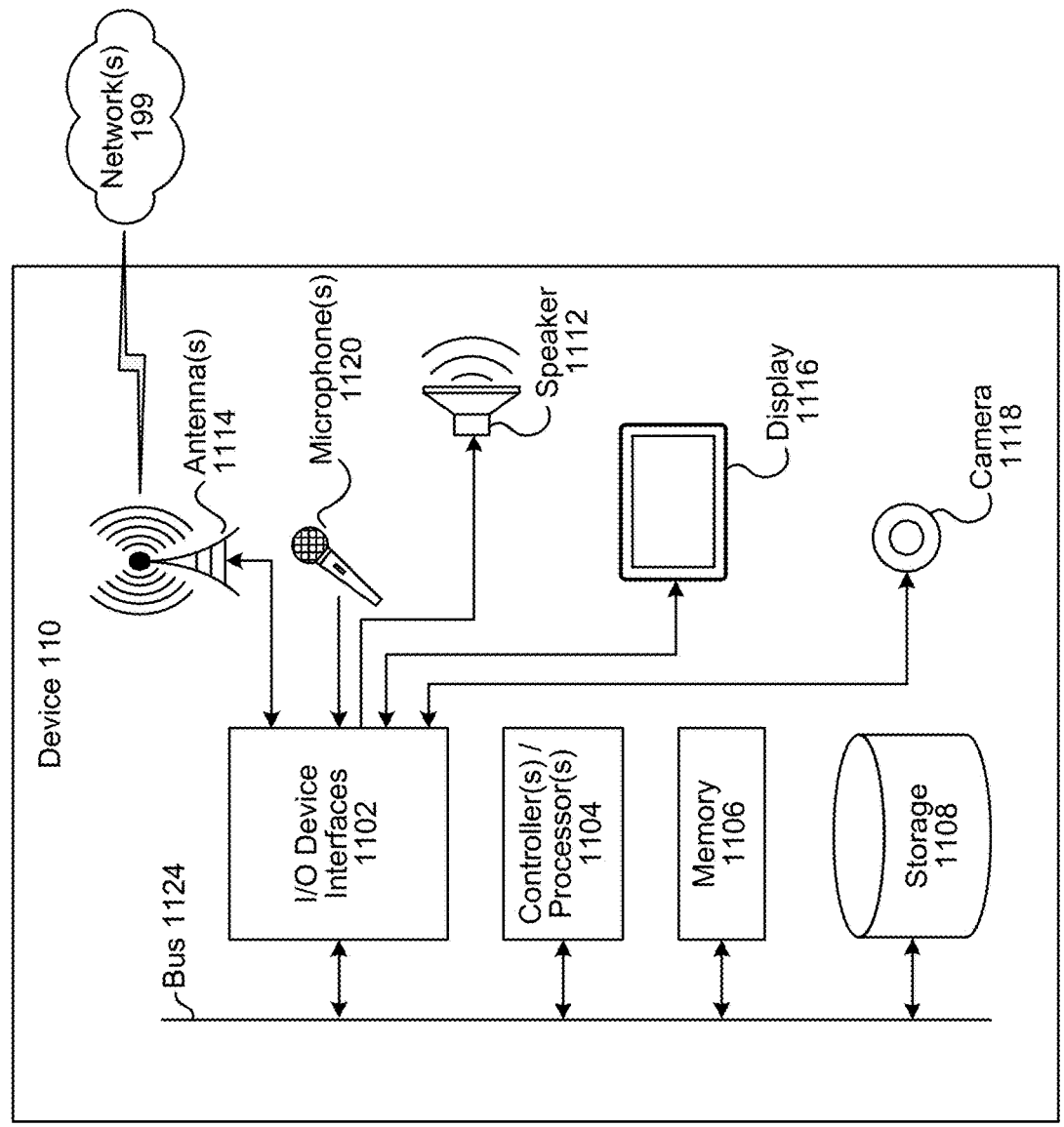
FIG. 11 is a block diagram conceptually illustrating example components of a device according to embodiments of the present disclosure.
Figure 12:
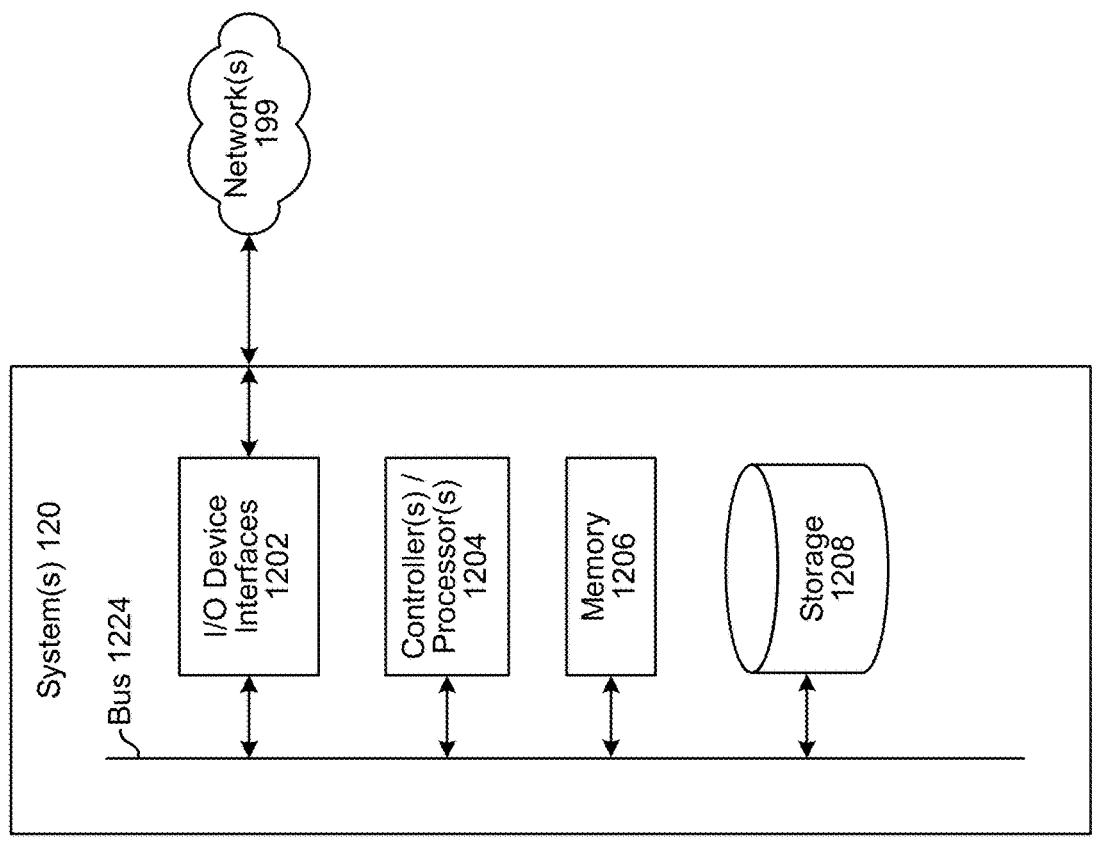
FIG. 12 is a block diagram conceptually illustrating example components of a server according to embodiments of the present disclosure.

FIG. 11 is a block diagram conceptually illustrating a device 110 that may be used with the system. FIG. 12 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/225) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1102/1202).

Computer instructions for operating each device (110/120/225) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/225) includes input/output device interfaces (1102/1202). A variety of components may be connected through the input/output device interfaces (1102/1202), as will be discussed further below. Additionally, each device (110/120/225) may include an address/data bus (1124/1224) for conveying data among components of the respective device. Each component within a device (110/120/225) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones 1120, a wired headset or a wireless headset (not illustrated), etc. If an array of microphones 1120 is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the I/O device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1102/1202) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1102/1202), processor(s) (1104/1204), memory (1106/1206), and/or storage (1108/1208) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 13:
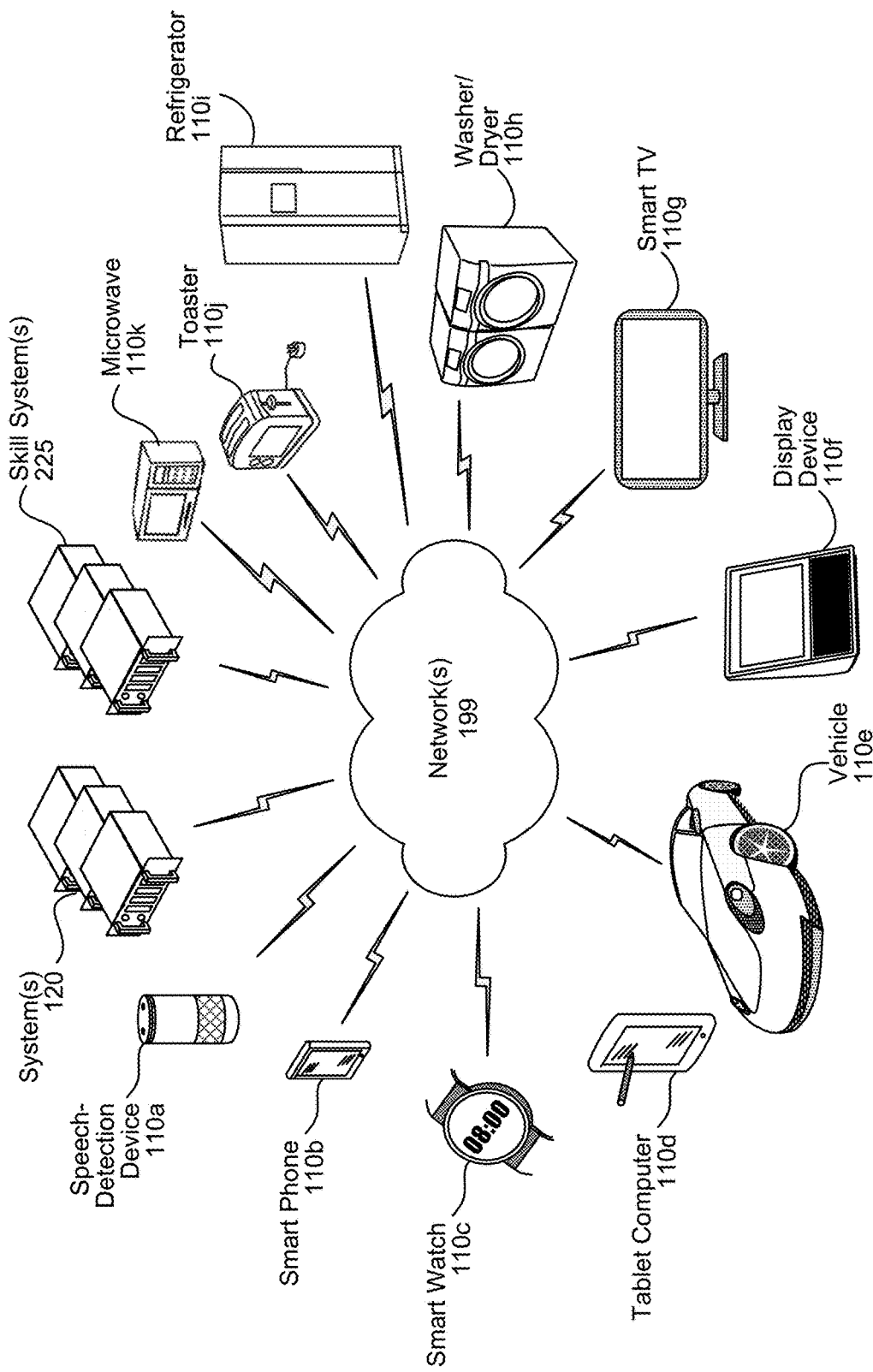
FIG. 13 illustrates an example of a computer network for use with the speech processing system.

As illustrated in FIG. 13, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining that audio was generated by an audio output device, the method comprising:
receiving input audio data from a user device;
determining, using the input audio data, a plurality of audio data segments;
processing a first audio data segment of the plurality of audio data segments using a first trained model to determine a first feature vector representing the first audio data segment, wherein the first trained model is configured to extract feature data from an audio data segment;
processing the first feature vector using at least a second trained model and a third trained model to generate first model output data, wherein the first model output data corresponds to the first audio data segment and to a portion of the input audio data occurring prior to the first audio data segment, wherein the second trained model is configured to process data corresponding to individual audio data segments and the third trained model includes a hidden layer representing historical data corresponding to at least one previous audio data segment;
processing a second audio data segment of the plurality of audio data segments using the first trained model to determine a second feature vector representing the second audio data segment;

processing the second feature vector using the second trained model, the third trained model and the first model output data to generate second model output data, the second model output data representing the second audio data segment, the first audio data segment and the portion;
determining, using the second model output data, a score indicating a likelihood that the second audio data segment represents audio generated by an audio output device rather than audio being spoken live by a human in an environment of the user device; and
based on the score, determining that the second audio data segment represents the audio generated by the audio output device.

2. The computer-implemented method of claim 1, further comprising:
processing the second feature vector using the second trained model to generate third model output data;
using the third trained model, processing the third model output data and the first model output data to generate the second model output data;
using a fourth trained model, processing the second model output data and the third model output data to generate fourth model output data, wherein the fourth trained model is a bi-directional LSTM; and
determining the score using the fourth model output data.

3. The computer-implemented method of claim 1, further comprising:
processing the second feature vector using the second trained model to generate third model output data;
processing a portion of the third model output data using a fourth trained model to generate fourth model output data, wherein processing the portion of the third model output data represents downsampling the third model output data;
determining an aggregated model output data by averaging output data of each network node in an output layer of the fourth trained model; and
using the third trained model, processing the first model output data and the aggregated model output data to generate the second model output data.

4. The computer-implemented method of claim 1, further comprising:
comparing the input audio data to stored audio data to determine the input audio data represents an event;
determining that the second audio data segment represents audio from a non-device source based on the score;
generating an indicator based on the second audio data segment representing the audio from the non-device source; and
sending the indicator to the user device.

5. A computer-implemented method comprising:
receiving a plurality of audio data segments corresponding to input audio data;
determining, using a first trained model, a first feature vector representing a first audio data segment of the plurality of audio data segments;
processing, using a second trained model, the first feature vector to generate first model output data corresponding to the first audio data segment and at least a second audio data segment of the plurality of audio data segments;
determining, using the first trained model, a second feature vector corresponding to a third audio data segment of the plurality of audio data segments; and
processing, using the second trained model, the second feature vector and the first model output data to determine a likelihood the third audio data segment represents audio generated by a media source.

6. The computer-implemented method of claim 5, further comprising:
receiving the input audio data;
determining the first audio data segment from the input audio data having a first beginpoint and a first endpoint; and
determining the second audio data segment from the input audio data having a second beginpoint and a second endpoint, wherein the second endpoint does not occur between the first beginpoint and the first endpoint.

7. The computer-implemented method of claim 6, wherein the second endpoint of the second audio data segment occurs prior to the first beginpoint of the first audio data segment in the input audio data, and processing, using the second trained model, the second feature vector and the first model output data represents processing historical data corresponding to a previous audio data segment of the plurality of audio data segments.

8. The computer-implemented method of claim 5, further comprising:
receiving the input audio data from a user device;
determining an event is represented in the second audio data segment;
determining that the second audio data segment represents audio from a non-media source based on the likelihood;
generating indication data based on the second audio data segment representing the audio from the non-media source; and
sending the indication data to the user device.

9. The computer-implemented method of claim 5, further comprising:
receiving the input audio data from a user device;
determining that a portion of a wakeword is represented in the second audio data segment;
determining that the second audio data segment represents the audio from the media source based on the likelihood;
generating indication data based on the second audio data segment representing the audio from the media source;
determining to stop further speech processing on the input audio data based on the second audio data segment representing the audio from the media source; and
sending the indication data to the user device.

10. The computer-implemented method of claim 5, further comprising:
receiving the input audio data from a user device;
determining that the second audio data segment represents the audio from the media source based on the likelihood; and
sending the input audio data to an analysis component.

11. The computer-implemented method of claim 5, further comprising:
processing the first feature vector using a third trained model to generate second model output data;
using the second trained model, processing the first model output data and the second model output data to generate third model output data;
using a fourth trained model, processing the second model output and the third model output data to generate fourth model output data; and
wherein determining the likelihood is based on the fourth model output data.

12. A system comprising:
at least one processor; and
at least one memory including instructions that, when executed by the at least one processor, cause the system to:
  receive a plurality of audio data segments corresponding to input audio data;
  determine, using a first trained model, a first feature vector representing a first audio data segment of the plurality of audio data segments;
  process, using a second trained model, the first feature vector to generate first model output data corresponding to the first audio data segment and at least a second audio data segment of the plurality of audio data segments;
  determine, using the first trained model, a second feature vector corresponding to a third audio data segment of the plurality of audio data segments; and
  process, using the second trained model, the second feature vector and the first model output data to determine a likelihood the third audio data segment represents audio generated by a media source.

13. The system of claim 12, wherein the instructions, when executed by the at least one processor, further cause the system to:
  receive the input audio data;
  determine the first audio data segment from the input audio data having a first beginpoint and a first endpoint; and
  determine the second audio data segment from the input audio data having a second beginpoint and a second endpoint, wherein the second endpoint does not occur between the first beginpoint and the first endpoint.

14. The system of claim 13, wherein the second endpoint of the second audio data segment occurs prior to the first beginpoint of the first audio data segment in the input audio data, and the instruction to process, using the second trained model, the second feature vector and the first model output data represents processing historical data corresponding to a previous audio segment.

15. The system of claim 12, wherein the instructions, when executed by the at least one processor, further cause the system to:
  receive the input audio data from a user device;
  determine an event is represented in the second audio data segment;
  determine that the second audio data segment represents audio from a non-media source based on the likelihood;
  generate indication data based on the second audio data segment representing the audio from the non-media source; and
  send the indication data to the user device.

16. The system of claim 12, wherein the instructions, when executed by the at least one processor, further cause the system to:
  receive the input audio data from a user device;
  determine that a portion of a wakeword is represented in the second audio data segment;
  determine that the second audio data segment represents the audio from the media source based on the likelihood;
  generate indication data based on the second audio data segment representing the audio from the media source;
  determine to stop further speech processing on the input audio data based on the second audio data segment representing the audio from the media source; and
  send the indication data to the user device.

17. The system of claim 12, wherein the instructions, when executed by the at least one processor, further cause the system to:
  receive the input audio data from a user device;
  determine that the second audio data segment represents the audio from the media source based on the likelihood; and
  send the input audio data to an analysis component.

18. The system of claim 12, wherein the instructions, when executed by the at least one processor, further cause the system to:
  process the first feature vector using a third trained model to generate second model output data;
  using the second trained model, processing the first model output data and the second model output data to generate third model output data;
  using a fourth trained model, process the second model output and the third model output data to generate fourth model output data; and
  wherein determining the likelihood is based on the fourth model output data.

* * * * *